Patented Sept. 19, 1922.

1,429,824

UNITED STATES PATENT OFFICE.

WILLIAM BULL ATWATER, OF CHARLESTON, SOUTH CAROLINA, ASSIGNOR TO CRYSTAL-ON CHEMICAL COMPANY, A CORPORATION OF SOUTH CAROLINA.

PREPARATION FOR PREVENTING ACCUMULATION OF MOISTURE ON TRANSPARENT SURFACES.

No Drawing. Application filed October 27, 1919. Serial No. 333,717.

*To all whom it may concern:*

Be it known that I, WILLIAM B. ATWATER, a citizen of the United States, residing at Charleston, in the county of Charleston, State of South Carolina, have invented certain new and useful Improvements in Preparation for Preventing Accumulation of Moisture on Transparent Surfaces, of which the following is a description, reference being had to the accompanying drawing and to the figures of reference marked thereon.

This invention relates to preparations for preventing the formation of moisture on exposed surfaces of transparent members so that the vision is not impaired.

The object of the present invention is to provide a preparation which may be applied to the surfaces of glass for effectively preventing the formation or collection of moisture on the glass in order to keep the glass clear and transparent.

A further object of this invention is to provide a substance of the above character which is most economical to manufacture, which is unobjectionable in its use, and which is effective to accomplish the purposes for which it is intended.

These and other objects of the invention will in part be obvious and will in part be hereinafter more fully disclosed.

In general the substance comprises a suitable mixture of water, tobacco extract and formaldehyde.

In the preparation of this improved substance, tobacco in any of its forms, such as leaf tobacco, tobacco waste or tobacco stalks is soaked in water, preferably soft water, for a considerable length of time, in the present case approximately thirty-six to forty-eight hours, after which the tobacco is subjected to requisite pressure in any preferred manner to squeeze the remaining juice therefrom into the water. After filtering or straining, the same is run into suitable receptacles where a small quantity of formaldehyde is added and the substance is then bottled for commercial use.

The specific portions of ingredients may be varied somewhat, but it has been found that one-quarter pound of tobacco substance is sufficient for one gallon of water, and to this should be added twelve drops of formaldehyde.

The addition of formaldehyde is necessary to prevent the fermentation of the tobacco extract which produces an extremely disagreeable and lasting odor. By the addition of this small quantity of formaldehyde or other fermentation preventative, the substance is made commercial. Experience has shown that preparations composed only of tobacco juice and water, or even with the addition of any deodorizer, are not commercial for the reason that this odor resulting from the fermentation persists after the deodorizer has become weak, producing an inherent odor which renders the substance unsaleable.

While other fermentation preventatives may possibly be used for preventing the disagreeable odor, I prefer to use formaldehyde for the reason that it performs another function. Formaldehyde acts upon the ingredients of the tobacco juice so as to increase the durability of the coating and the life of the efficiency thereof. As a matter of fact, if too much formaldehyde is used, an objectionable white coating is formed on the transparent member which is very hard and difficult to remove. By using the formaldehyde, however, in the proportions named above or thereabouts, no white coating is formed, but there is a certain action which takes place which increases the durability of the preparation as a moisture preventing agent.

When this preparation has been spread on the exposed surfaces of a transparent member, it will be found that frost will not collect thereon, and that raindrops striking the same run off immediately, leaving the glass clear and transparent and the vision unimpaired.

It will of course be understood that the above described portions of ingredients and manner of preparing the substance may be modified within the scope of this invention, as set forth in the appended claims.

Having thus described my invention, what I claim as new and desire to secure by Letters Patent is:—

1. A preparation for preventing the formation of moisture on the exposed surfaces of transparent members comprising a mixture of tobacco juice, water and a proportion of formaldehyde sufficient to prevent fermentation of the tobacco juice, but in amount insufficient to cause formation of a white coating.

2. A preparation for preventing the formation of moisture on the exposed surfaces of transparent members comprising a mixture of the following substantial proportions—one gallon of water, one-quarter pound of tobacco substance, and twelve drops of formaldehyde.

In testimony whereof, I affix my signature.

WILLIAM BULL ATWATER.